United States Patent
Al Majid et al.

(10) Patent No.: US 12,105,932 B2
(45) Date of Patent: *Oct. 1, 2024

(54) CONTEXT BASED INTERFACE OPTIONS

(71) Applicant: Snap Inc., Santa Monica, CA (US)

(72) Inventors: Newar Husam Al Majid, New York, NY (US); Nathan Kenneth Boyd, Los Angeles, CA (US); Laurent Desserrey, Los Angeles, CA (US); Patrick Mandia, Venice, CA (US); Matthew Thompson, Venice, CA (US); Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,716

(22) Filed: Oct. 13, 2022

(65) Prior Publication Data

US 2023/0030397 A1    Feb. 2, 2023

Related U.S. Application Data

(63) Continuation of application No. 16/588,218, filed on Sep. 30, 2019, now Pat. No. 11,494,052.

(51) Int. Cl.
*G06F 3/048*    (2013.01)
*G06F 3/0482*    (2013.01)
(Continued)

(52) U.S. Cl.
CPC ............ *G06F 3/0482* (2013.01); *G06F 3/048* (2013.01); *G06F 16/41* (2019.01); *G06F 16/435* (2019.01);
(Continued)

(58) Field of Classification Search
None
See application file for complete search history.

(56) References Cited

U.S. PATENT DOCUMENTS 8,381,133 B2    2/2013    Iwema et al.
8,504,922 B2    8/2013    Newell et al.
(Continued)

FOREIGN PATENT DOCUMENTS

WO    WO-2014025583 A2 *    2/2014    ....... H04N 21/23109

OTHER PUBLICATIONS

"U.S. Appl. No. 16/588,218, Final Office Action mailed Jan. 11, 2021", 15 pgs.
(Continued)

*Primary Examiner* — Xuyang Xia
(74) *Attorney, Agent, or Firm* — Schwegman Lundberg & Woessner, P.A.

(57)    ABSTRACT

A contextual menu system may be configured to perform operations that include: identifying a media category based on a user profile, the user profile comprising user profile data; causing display of a GUI that includes a content menu, the content menu comprising at least a display of a set of media items associated with the media category identified based on the user profile data, the set of media items comprising at least a first media item; accessing the user profile data of the user profile, the user profile data including a browser history associated with the user profile; identifying the first media item among the browser history; and removing the content menu within the GUI in response to the identifying the first media item among the browser history.

15 Claims, 13 Drawing Sheets

(51) Int. Cl.
*G06F 16/41* (2019.01)
*G06F 16/435* (2019.01)
*G06F 16/44* (2019.01)
*H04L 67/306* (2022.01)
*H04L 67/50* (2022.01)

(52) U.S. Cl.
CPC ............ *G06F 16/44* (2019.01); *H04L 67/306* (2013.01); *H04L 67/535* (2022.05)

(56) References Cited

U.S. PATENT DOCUMENTS

| | | | |
|---|---|---|---|
| 9,336,325 B2* | 5/2016 | Bamford | G06F 16/9577 |
| 11,494,052 B1 | 11/2022 | Al Majid et al. | |
| 2006/0107219 A1 | 5/2006 | Ahya et al. | |
| 2006/0120518 A1 | 6/2006 | Ahya | |
| 2006/0242597 A1* | 10/2006 | Park | G06F 3/0482 |
| | | | 715/810 |
| 2007/0160345 A1* | 7/2007 | Sakai | G06F 3/04817 |
| | | | 386/230 |
| 2010/0070926 A1* | 3/2010 | Abanami | G06F 3/0488 |
| | | | 715/835 |
| 2010/0287468 A1* | 11/2010 | Reifman | G06F 3/0482 |
| | | | 715/702 |
| 2012/0210200 A1 | 8/2012 | Berger et al. | |
| 2013/0346875 A1* | 12/2013 | Klein | G06Q 50/01 |
| | | | 715/745 |
| 2014/0089446 A1 | 3/2014 | Mallikarjunan et al. | |
| 2014/0122502 A1* | 5/2014 | Kalmes | G06F 16/435 |
| | | | 707/748 |
| 2014/0129942 A1 | 5/2014 | Rathod | |
| 2014/0149424 A1* | 5/2014 | Kalmes | G06F 16/435 |
| | | | 707/748 |
| 2014/0304738 A1 | 10/2014 | Nakaoka et al. | |
| 2015/0331940 A1 | 11/2015 | Manning | |
| 2016/0224397 A1 | 8/2016 | Arora et al. | |
| 2017/0316519 A1* | 11/2017 | Wang | G06N 20/00 |
| 2017/0337838 A1* | 11/2017 | Elkon | G06F 3/013 |
| 2017/0357421 A1* | 12/2017 | Dye | H04N 21/8113 |
| 2018/0063064 A1* | 3/2018 | Borse | H04L 67/06 |
| 2018/0173381 A1* | 6/2018 | Bakker | G06F 16/9535 |
| 2018/0176633 A1* | 6/2018 | Yeo | G06V 20/46 |
| 2018/0191962 A1 | 7/2018 | Javier et al. | |
| 2018/0307760 A1* | 10/2018 | Wittke | G06F 16/48 |
| 2019/0171762 A1* | 6/2019 | Luke | G06F 16/635 |
| 2019/0342770 A1 | 11/2019 | Ganapathi et al. | |

OTHER PUBLICATIONS

"U.S. Appl. No. 16/588,218, Final Office Action mailed Mar. 15, 2022", 23 pgs.
"U.S. Appl. No. 16/588,218, Final Office Action mailed Aug. 10, 2021", 18 pgs.
"U.S. Appl. No. 16/588,218, Final Office Action mailed Sep. 3, 2020", 12 pgs.
"U.S. Appl. No. 16/588,218, Non Final Office Action mailed May 13, 2021", 15 pgs.
"U.S. Appl. No. 16/588,218, Non Final Office Action mailed May 14, 2020", 11 pgs.
"U.S. Appl. No. 16/588,218, Non Final Office Action mailed May 27, 2022", 22 pgs.
"U.S. Appl. No. 16/588,218, Non Final Office Action mailed Oct. 1, 2020", 11 pgs.
"U.S. Appl. No. 16/588,218, Non Final Office Action mailed Oct. 21, 2021", 19 pgs.
"U.S. Appl. No. 16/588,218, Notice of Allowance mailed Jul. 5, 2022", 12 pgs.
"U.S. Appl. No. 16/588,218, Response filed Jan. 21, 2022 to Non Final Office Action mailed Oct. 21, 2021", 11 pgs.
"U.S. Appl. No. 16/588,218, Response filed Apr. 7, 2021 to Final Office Action mailed Jan. 11, 2021", 10 pgs.
"U.S. Appl. No. 16/588,218, Response filed May 13, 2022 to Final Office Action mailed Mar. 15, 2022", 11 pgs.
"U.S. Appl. No. 16/588,218, Response filed May 29, 2020 to Non Final Office Action mailed May 14, 2020", 10 pgs.
"U.S. Appl. No. 16/588,218, Response filed Jun. 16, 2021 to Non Final Office Action mailed May 13, 2021", 9 pgs.
"U.S. Appl. No. 16/588,218, Response filed Jun. 16, 2022 to Non Final Office Action mailed May 27, 2022", 11 pgs.
"U.S. Appl. No. 16/588,218, Response filed Sep. 16, 2020 to Final Office Action mailed Sep. 3, 2020", 10 pgs.
"U.S. Appl. No. 16/588,218, Response filed Oct. 11, 2021 to Final Office Action mailed Aug. 10, 2021", 11 pgs.
"U.S. Appl. No. 16/588,218, Response filed Oct. 12, 2020 to Non Final Office Action mailed Oct. 1, 2020", 10 pgs.

* cited by examiner

400

IDENTIFYING A MEDIA CATEGORY BASED ON A USER PROFILE, THE USER PROFILE COMPRISING USER PROFILE DATA
402

CAUSING DISPLAY OF A GRAPHICAL USER INTERFACE (GUI) THAT INCLUDES A CONTENT MENU, THE CONTENT MENU COMPRISING AT LEAST A DISPLAY OF A SET OF MEDIA ITEMS ASSOCIATED WITH THE MEDIA CATEGORY
404

ACCESSING THE USER PROFILE DATA OF THE USER PROFILE, THE USER PROFILE DAAT INCLUDING A BROWSER HISTORY ASSOCIATED WITH THE USER PROFILE
406

IDENTIFYING THE FIRST MEDIA ITEM AMONG THE BROWSER HISTORY
408

REMOVING THE CONTENT MENU FROM WITHIN THE GUI IN RESPONSE TO THE IDENTIFYING THE FIRST MEDIA ITEM AMONG THE BROWSER HISTORY
410

ACCESSING A MEDIA REPOSITORY THAT COMPRISES A COLLECTION OF MEDIA CONTENT, THE COLLECTION OF MEDIA CONTENT INCLUDING AT LEAST THE SET OF MEDIA ITEMS
602

CURATING THE SET OF MEDIA ITEMS ASSOCIATED WITH THE MEDIA CATEGORY FROM THE MEDIA REPOSITORY BASED ON THE USER PROFILE FROM THE USER PROFILE
604

700

```
┌─────────────────────────────────────────────────────────────┐
│ RECEIVING AN INPUT THAT SELECTS THE FIRST MEDIA ITEM FROM   │
│         AMONG THE DISPLAY OF THE SET OF MEDIA ITEMS         │
│                            702                              │
└─────────────────────────────────────────────────────────────┘
                              │
                              ▼
┌─────────────────────────────────────────────────────────────┐
│    GENERATING A PRESENTATION OF THE FIRST MEDIA ITEM, THE   │
│ PRESENTATION OF THE FIRST MEDIA ITEM INCLUDING A GRAPHICAL ICON │
│           ASSOCIATED WITH THE MEDIA CATEGORY                │
│                            704                              │
└─────────────────────────────────────────────────────────────┘
                              │
                              ▼
┌─────────────────────────────────────────────────────────────┐
│   CAUSING DISPLAY OF THE PRESENTATION OF THE FIRST MEDIA ITEM │
│                      WITHIM THE GUI                         │
│                            706                              │
└─────────────────────────────────────────────────────────────┘
```

*FIG. 7*

CONTEXT BASED INTERFACE OPTIONS

CLAIM OF PRIORITY

This application is a continuation of and claims the benefit of priority to U.S. patent application Ser. No. 16/588,218, filed Sep. 30, 2019, which is incorporated by reference herein in its entirety.

TECHNICAL FIELD

Embodiments of the present disclosure relate generally to mobile computing technology and, more particularly, but not by way of limitation, to systems for generating and presenting contextual interface options.

BACKGROUND

Social media platforms have become the primary source of news for most internet users in the world. As a result, the amount of news and media available for online consumption has increased exponentially, making the act of actually identifying relevant news and media to consume increasingly difficult.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of generating and causing display of a menu element to present dynamically curated content, according to certain example embodiments.

FIG. 7 is a flowchart depicting a method of generating and causing display of media content, according to certain example embodiments.

DETAILED DESCRIPTION

Figure 1:
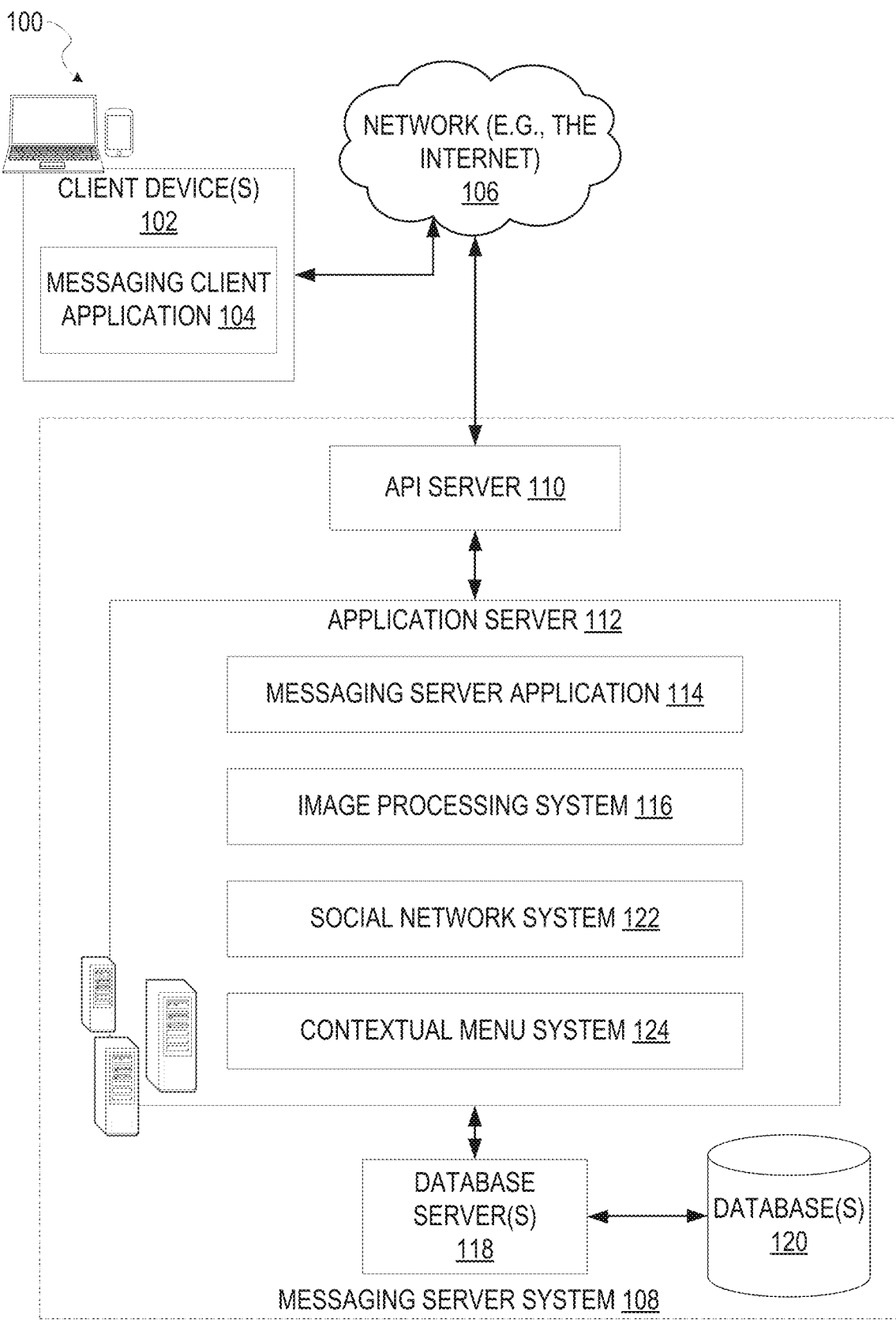
FIG. 1 is a block diagram showing an example messaging system for exchanging data (e.g., messages and associated content) over a network in accordance with some embodiments, wherein the messaging system includes a dynamic menu system.

News and media consumption via online sources has increased dramatically. The resulting increase in news and media available online has made it increasingly difficult to find and consume relevant content due to the media being buried like a needle in an always-growing haystack. Accordingly, example embodiments discussed herein relate to a specially configured graphical user interface (GUI) to generate and display a presentation of context-based media options for consumption, based on a plurality of contextual inputs received by a system.

According to certain example embodiments, a contextual menu system may be configured to perform operations that include: identifying a media category based on a user profile, the user profile comprising user profile data; causing display of a GUI that includes a content menu, the content menu comprising at least a display of a set of media items associated with the media category identified based on the user profile data, the set of media items comprising at least a first media item; accessing the user profile data of the user profile, the user profile data including a browser history associated with the user profile; identifying the first media item among the browser history; and removing the content menu within the GUI in response to the identifying the first media item among the browser history.

In some example embodiments, the set of media items may include videos, articles, interactive media, as well as user generated content. The media content may be hosted by a third-party provider and accessible through a uniform resource locator (URL), or in some embodiments may be hosted at one or more client devices, or a server system associated with the contextual menu system.

The content menu may comprise a display of a presentation of a set of user selectable icons corresponding to consumable media content among the set of media content. In some embodiments, the user selectable icons comprise graphical properties based on one or more attributes of the corresponding media content. For example, the graphical properties may include colors and logos associated with a media category associated with the media content. Accordingly, each user selectable icon may include a display of the attributes of the media content based on the graphical properties associated with the corresponding media category.

In some example embodiments, the set of media content presented within the content menu may be dynamically updated based on user profile data associated with a user profile. For example, in some embodiments, the contextual menu system may update the content menu to present new or unconsumed media content. In such embodiments, responsive to detecting one or more media items from among the set of media content presented in the content menu, the contextual menu system removes the graphical element corresponding to the one or more media items from the content menu, and may cause the presentation of the content menu itself to retract, or collapse so as to take up a smaller amount of space within the GUI.

In some example embodiments, responsive to collapsing the content menu within the GUI, the contextual menu system may generate and cause display of a presentation of a set of media items, wherein the set of media items may be identified based on a predefined set of search criteria associated with a user profile.

As an illustrative example from a user perspective, a user of a client device may execute an application at the client device which performs the operations of the context-based menu system discussed above. Responsive to launching the application, a GUI (i.e., a homepage) may be generated for the user, based on user profile data associated with the user, wherein the user profile data includes a browser history, a listing of user affinities (i.e., based on explicit user inputs as well as implicit user interactions), as well as location data, temporal data, and user demographics information. The GUI generated by the context-based menu system may comprise a presentation of a content menu at a position within the GUI, wherein the content menu comprises a display of media content curated based on the user profile data from the user profile.

The media content within the content menu may be curated from one or more media categories, wherein the media categories are selected based on explicit user input Or based on implicit user interaction data determined based on the user profile data. For example, the media categories may include (but are not limited to) politics, music, horoscope, odd news, weather, technology, local, finance, and entertainment. Accordingly, the context-based menu system accesses the user profile of the user and identifies one or more media categories which may be of interest to the user based on the corresponding user profile data. In some embodiments, the identification of media categories may be performed based on a machine learned model trained to correlate media categories with user profile data. Based on the identified media categories, the context-based menu system accesses a content repository to identify one or more media items which may be of interest to the user from each identified media category.

The context-based menu system then generates and causes display of a set of media content within the content menu, wherein each media item among the set of media content is presented based on its corresponding media category and one or more attributes associated with the media item. For example, each media category may be associated with certain graphical properties, such as a logo or color, and the attributes of the media items may include an identification of a publisher, a timestamp, as well as media content such as images or videos.

The user of the client device may then access and view the relevant media content by providing an input that selects a presentation of a media item from among the set of media content presented in the content menu. Responsive to the context-based menu system detecting that the user has consumed all of the media content presented in the content menu, the context-based menu system may collapse a display of the content menu, and replace the content menu with a window to display a predefined listing of media items based on a predefined set of search criteria associated with the user account. For example, the predefined set of search criteria may filter media content based on location, time, and user preferences and demographics information associated with the user profile.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event relating to the messaging client application 104).

The application server 112 hosts a number of applications and subsystems, including a messaging server application 114, an image processing system 116, a social network system 122, and a contextual menu system 124. The contextual menu system 124 is configured to generate a contextual menu element presented within a GUI at a client device 102. Further details of the contextual menu system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of be hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 11 is communicatively coupled to a database server 118, which facilitates access to a database 120 in which is stored data associated with messages processed by the messaging server application 114.

Figure 2:
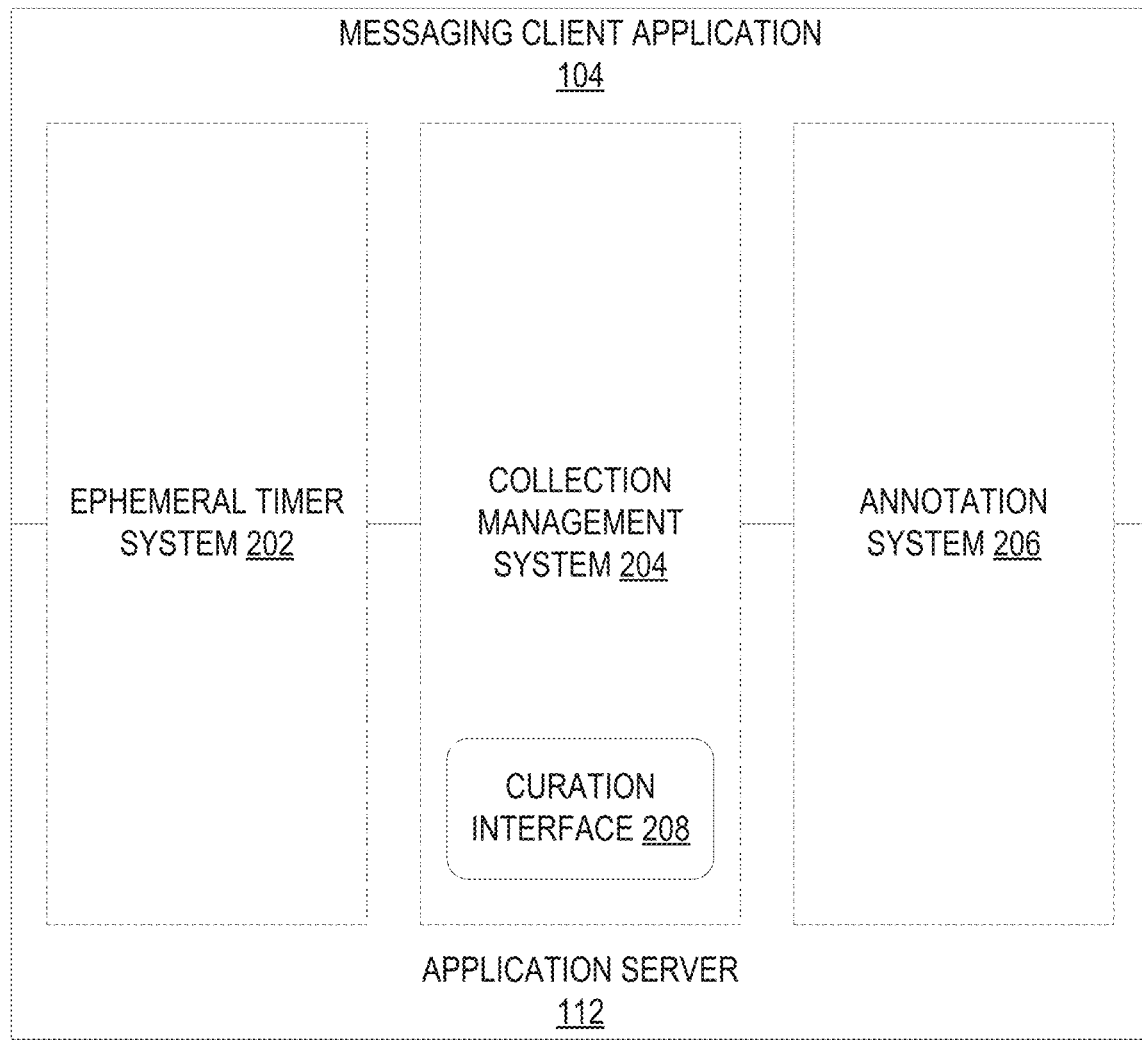
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral tinier system 202 incorporates a number of timers that, based on duration and display parameters associated with a message, collection of messages (e.g., a SNAPCHAT story), or graphical element, selectively display and enable access to messages and associated content via the messaging client application 104.

Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter, lens) to the messaging client application 104 based on a geolocation of the client device 102, In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House), In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
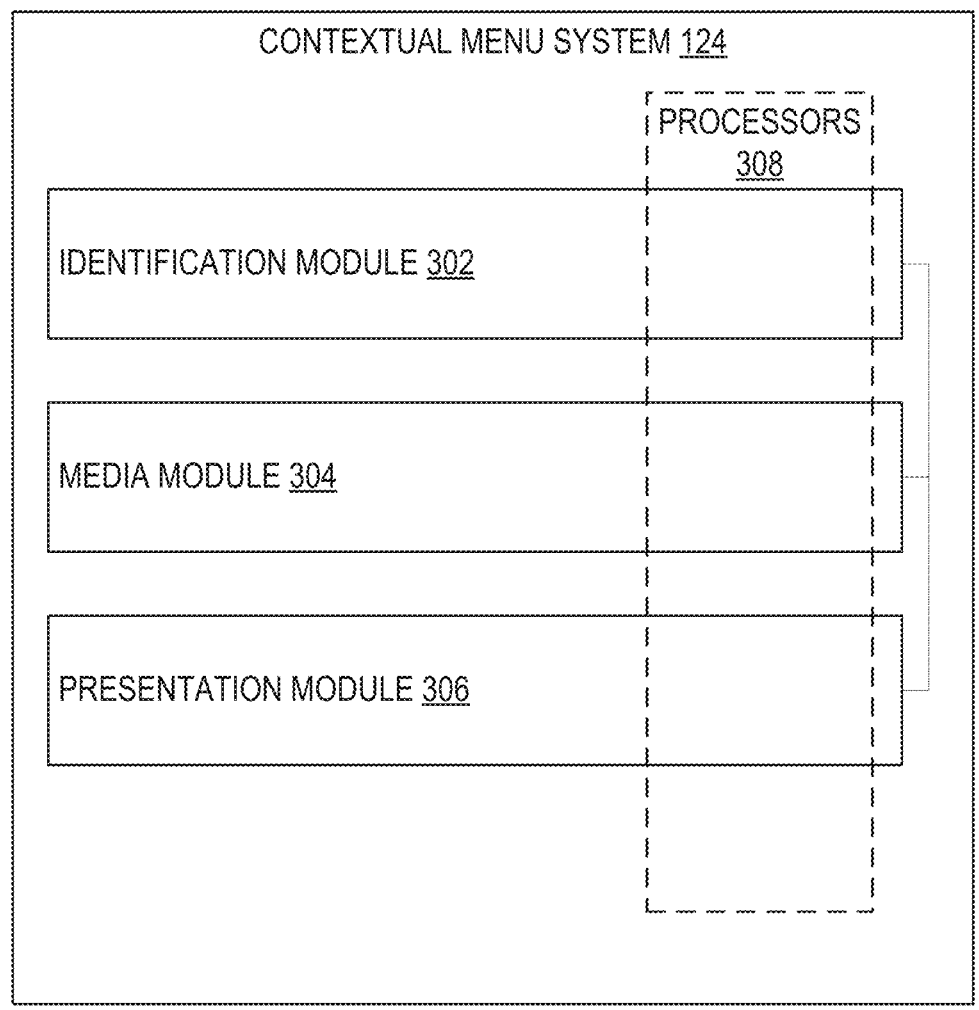
FIG. 3 is a block diagram illustrating various modules of a contextual menu system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the contextual menu system 124 that configure the contextual menu system 124 to perform operations to generate and cause display of a menu element within a GUI, wherein the menu element may display a dynamically curated collection of media content, according to certain example embodiments.

In further embodiments, the components of the contextual menu system 124 may configure the contextual menu system 124 to perform operations that include: identifying a media category based on contextual data that may include location data and temporal data, as well as a user profile, wherein the user profile comprising user profile data; causing display of a GUI that includes a content menu, the content menu comprising at least a display of a dynamically curated set of media items associated with the media category identified based on the context data and the user profile data, wherein the set of media items comprising at least a first media item; accessing the user profile data of the user profile, the user profile data including a browser history associated with the user profile; identifying the first media item among the browser history; and removing the content menu within the GUI in response to the identifying the first media item among the browser history, according to some example embodiments.

The contextual menu system 124 is shown as including an identification module 302, a media module 304, and a presentation module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308.

Any one or more of the modules described may be implemented using hardware alone (e.g., one or more of the processors 308 of a machine) or a combination of hardware and software. For example, any module described of the contextual menu system 124 may physically include an arrangement of one or more of the processors 308 (e.g., a subset of or among the one or more processors of the machine) configured to perform the operations described herein for that module. As another example, any module of the contextual menu system 124 may include software, hardware, or both, that configure an arrangement of one or more processors 308 (e.g., among the one or more processors of the machine) to perform the operations described herein for that module. Accordingly, different modules of the contextual menu system 124 may include and configure different arrangements of such processors 308 or a single arrangement of such processors 308 at different points in time. Moreover, any two or more modules of the contextual menu system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of generating and causing display of menu element to present dynamically curated content within a GUI, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the identification module 302 identifies one or more media categories based on context factors that includes at least user profile data from a user profile associates with a client device 102. The contextual factors may for example include location data, temporal data, as well as user demographics information, and user affinities that may be explicitly defined by the user or determined based on implicit user activities (i.e., the user's media consumption history).

In some example embodiments, a user of the client device 102 may provide an input that selects the one or more media categories from a presentation of a set of media categories. For example, in some embodiments, the presentation module 306 may cause display of a presentation of the set of media categories within a GUI at the client device 102, wherein the presentation of the set of media categories comprises a set of user selectable options. The user of the client device 102 may thereby provide an input that selects one or more of the media categories from among the presentation of the set of media categories.

In some example embodiments, the identification module 302 may identify the one or more media categories based on a machine learned model. For example, the machine learned model may be trained based on a set of training data that, correlates user profile data with context data that includes the user profile data. Accordingly, the identification module 302 may access the context data, and apply the machine learned model to identify one or more media categories based on the context data.

Each media category from among the presentation of the set of media categories may be associated with a corresponding media repository at a database 120, or in some embodiments at the client device 102, or from third party sources accessed through the network 106. For example, the media category may correspond with a certain media tag that identifies media content from within the database 120 or the client device 102. As an illustrative example, the media category "News" may correspond with a plurality of media items that are assigned the tag "News" within the database 120, wherein the plurality of media items may include articles, videos, or other media items. In some embodiments, the media category may also be associated with a particular resource, wherein the resource publishes or provides access to media items. For example, the media category "News" may be correlated with a URL that contains associated media items.

Responsive to the identification module 302 identifying the one or more media categories based on context data that includes at least user profile data, at operation 404, the presentation module 306 generates and causes display of a GUI at the client device 102. According to certain example embodiments, the GUI generated by the presentation module 306 includes a content menu (e.g., the content menu 1002 depicted in FIG. 10), wherein the content menu comprises at least a display of a set of media items associated with the one or more media categories identified by the identification module 302.

In some embodiments, the media items identified via the display of the set of media items may be accessed via a user input that selects a display of a media item from the content menu. Accordingly, responsive to receiving an input that selects a media item from among the set of media items from within the content menu, the media module 304 may access a resource associated with the media item in order to retrieve and present the media item at the client device 102.

In some embodiments, presenting the media item at the client device 102 may include presenting a display of the media item at a position within the GUI.

At operation 406, the media module 306 accesses a user profile associated with a user of the client device 102, wherein the user profile includes user profile data that comprises at least a browser history. The browser history may for example include a user interaction history that indicates URI, accessed by the user at the client device 102, as well as links clicked by the user of the client device 102, such as the set of media items presented within the content menu.

At operation 408, the media module 304 identifies an indication that the user of the client device accessed a first media item that was presented among the set of media items within the content menu of the GUI. For example, the browser history of the user may include a reference to the first media item.

At operation 410, responsive to the media module 304 determining that the user has accessed the first media item presented among the set of media items within the content menu, the presentation module 306 eliminates a display of the first media item from among the set of media items within the content menu. Accordingly, responsive to the media module 304 determining that the user has accessed all of the media items presented within the content menu within the GUI, the presentation module 306 may remove the content menu from the GUI in its entirety, and may replace the content menu with a set of media items based on a predefined set of search criteria associated with the user profile.

For example, the set of search criteria may be based on user preferences defined by the user, or in some embodiments may be based on a user's current location, a time of day, or based on administrator settings defined by an administrator of the contextual menu system 124.

Figure 5:
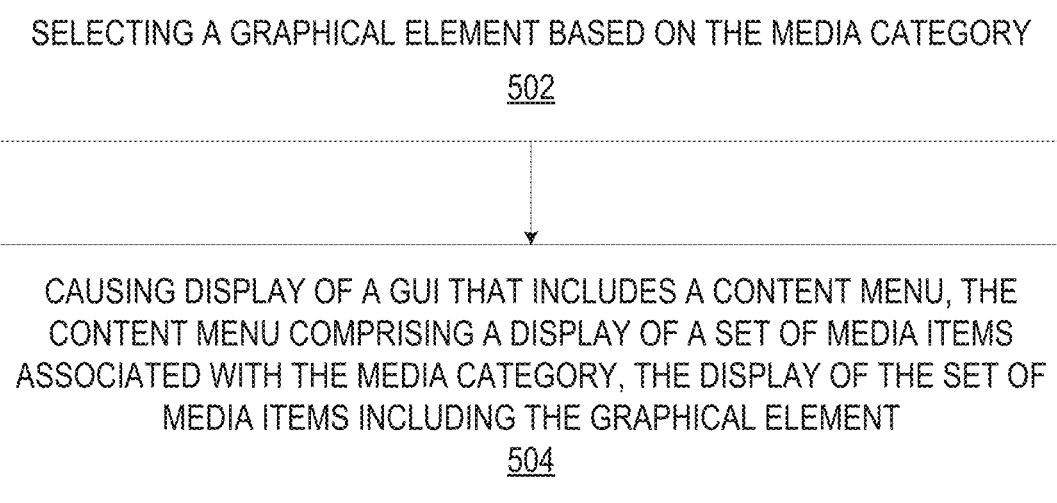
FIG. 5 is a flowchart depicting a method of generating and causing display of a menu element to present dynamically curated content, according to certain example embodiments.

FIG. 5 is a flowchart depicting a method 500 of generating and causing display of menu element to present dynamically curated content within a GUI, according to certain example embodiments. Operations of the method 500 may be performed by the modules described above with respect to FIG. 3. In some embodiments, the method 500 may be performed as part of (i.e., a subroutine) operation 404, as depicted in the method 400. As shown in FIG. 5, the method 500 includes one or more operations 502 and 504.

At operation 502, responsive to the identification module 302 identifying the one or more media categories, the media module 304 accesses a repository to retrieve one or more graphical elements associated with each of the one or more media categories. For example, the graphical elements may include logos or other identifiers associated with the one or more media categories.

Figure 9:
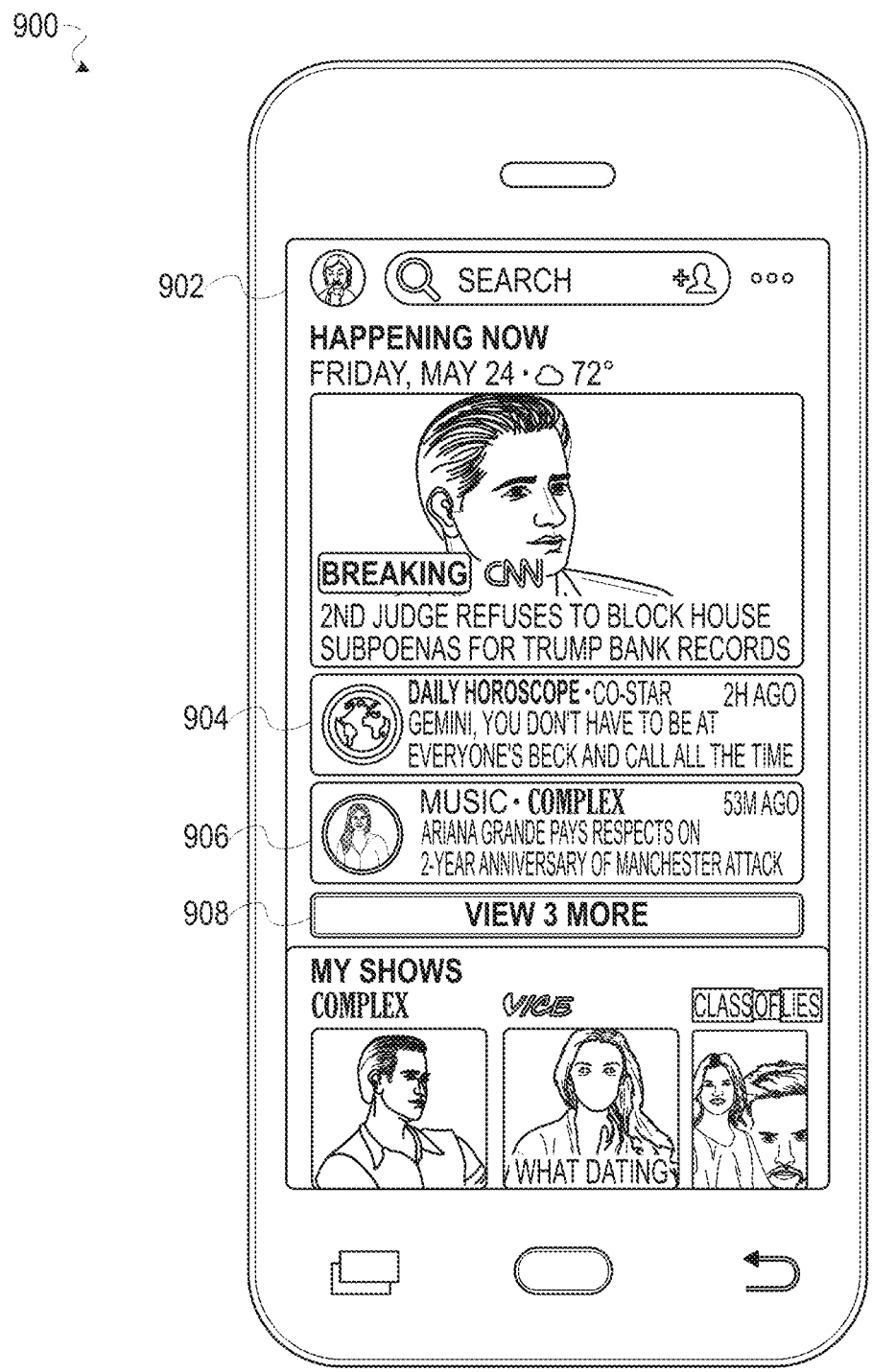
FIG. 9 is an interface diagram depicting a content menu generated and displayed by the contextual menu system, according to certain example embodiments.
Figure 10:
FIG. 10 is an interface diagram depicting a content, menu generated and displayed the contextual menu, according to certain example embodiments.

At operation 504, the presentation module 306 generates and causes display of a GUI that includes a content menu, such as the content menu 902 of FIG. 9, and 1002 of FIG. 10, wherein the content menu comprises a display of a set of media items, such as the set of media items 904, and wherein each media item among the set of media items may include a display of a graphical element associated with its corresponding media category, such as the graphical element 906.

Figure 6:
FIG. 6 is a flowchart depicting a method of generating and causing display of a menu element to present dynamically curated content, according to certain example embodiments.

FIG. 6 is a flowchart depicting a method 600 of generating and causing display of menu element to present dynamically curated content within a GUI, according to certain example embodiments. Operations of the method 600 may be performed by the modules described above with respect to FIG. 3. In some embodiments, the method 600 may be performed as part of (i.e., a subroutine) operation 402, as depicted in the method 400. As shown in FIG. 6, the method 600 includes one or more operations 602 and 604.

At operation 602, responsive to the identification module 302 identifying the one or more media categories, the media module 304 accesses one or more repositories based on the one or more media categories to identify relevant media content to be presented within the content menu. For example, each media category may be associated with a corresponding media location of a server system.

Accordingly, based on the one or more media categories identified by the identification module 302, at operation 604 the media module 304 curates a set of media items for each of the one or more media categories.

In some embodiments, the set of media items may be curated based on user profile data associated with the client device, including but not limited to user preferences, explicit user inputs that identify specific query terms, implicit user inputs based on user consumption history, as well as user demographics information and location data.

In some embodiments, the media module 304 may curate the set of media items based on a machine learned model trained to correlate media items to user profile data.

FIG. 7 is a flowchart depicting a method 700 of generating and causing display of media content within a GUI, according to certain example embodiments. Operations of the method 700 may be performed by the modules described above with respect to FIG. 3. As shown in FIG. 7, the method 700 includes one or more operations 702, 704, and 706.

At operation 702, the media module 304 receives an input that selects a first media item from among the display of the set of media items within the content menu.

At operation 704, responsive to receiving the input that selects the first media item from among the display of the set of media items within the content menu, the presentation module 306 generates a presentation of the first media. In some embodiments, the presentation of the first media item generated by the presentation module 306 may include a display of a graphical icon associated with a media category associated with the first media item. At operation 706, the presentation module 306 causes display of the presentation of the first media item at a position within the GUI at the client device 102.

Figure 8:
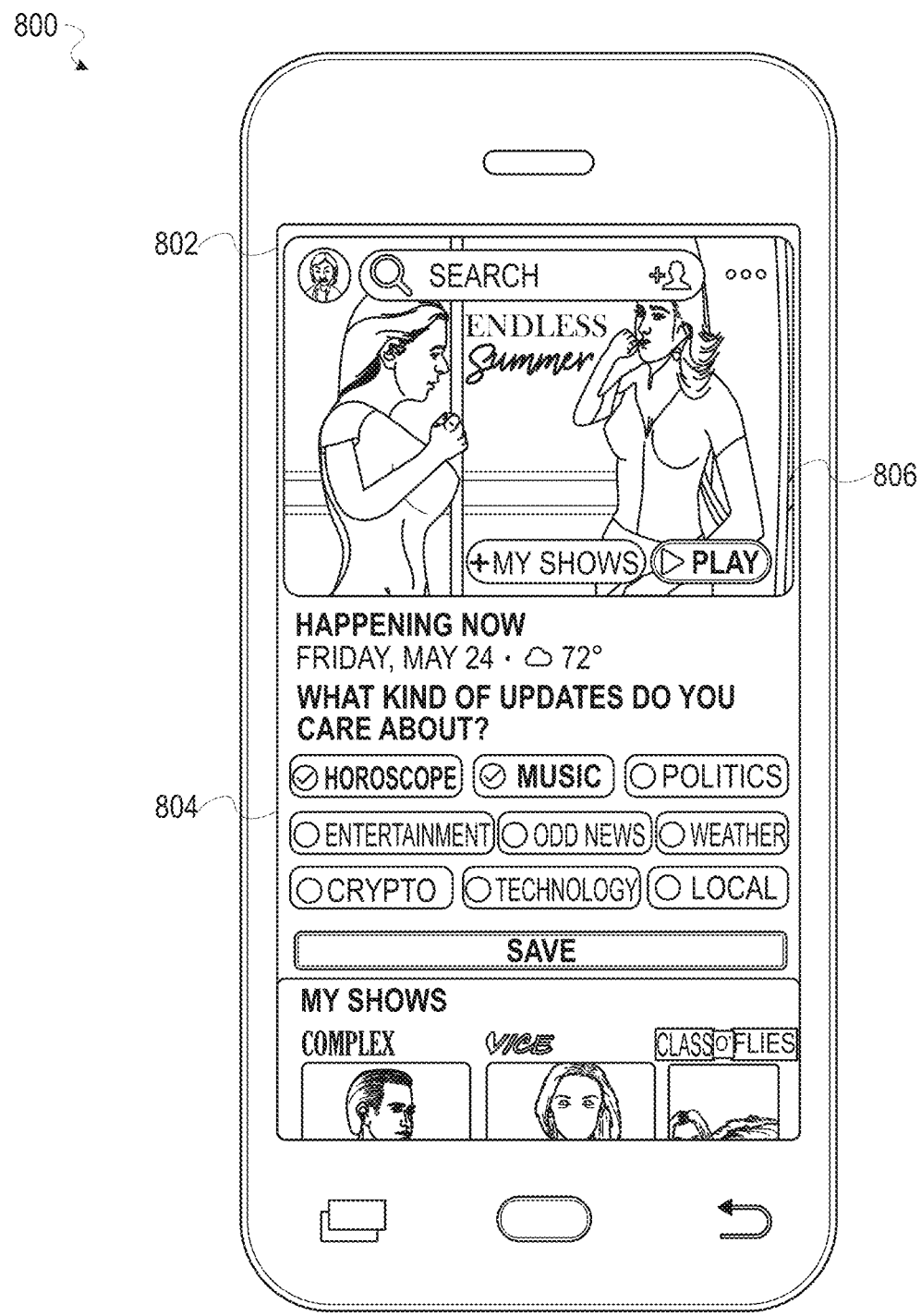
FIG. 8 is an interface diagram depicting a GUI generated and displayed by a contextual menu system, according to certain example embodiments.

FIG. 8 is an interface diagram 800 depicting a GUI 802 generated and displayed by the contextual menu system 124. As seen in FIG. 8, the GUI 802 includes a display of a user selectable set of media categories 804, and a display window 806 to present media content based on context data or a user selection.

As seen in the interface diagram 800, a user of the client device 102 may provide inputs that select one or more of the user selectable set of media categories 804 in order to define user preferences associated with a user profile. For example, a user of the client device 102 may provide a user input that selects a media category from among the set of media categories 804.

FIG. 9 is an interface diagram 900 depicting a content menu 902 generated and displayed by the contextual menu system 124. As seen in FIG. 9, the content menu 902 includes a plurality of menu elements (menu elements 904, 906, and 908) to display media content based on corresponding media categories.

As seen in FIG. 9, the media categories presented in the content menu 902 may include a "Horoscope" category, as well as a "Music" category. Accordingly, the contextual menu system 124 may present one or more media content options that correspond with the media category of a particular menu element. For example, the menu element 902 may present media content associated with a "Horoscope" media category, while the menu element 906 may present media associated with a "Music" media category.

In some embodiments, each media category may has a corresponding set of filter criteria to identify relevant media content to be presented within the content menu 902, based on context data that includes user profile data. As an illustrative example, the "Horoscope" media category may access a media repository to retrieve relevant media based on user profile data that includes a date of birth, a location, and demographics information, while the "Music" media category may access a separate media repository to retrieve relevant media based on user profile data that includes user preferences, and a media consumption history of the user. Accordingly, the contextual menu system 124 may filter and present relevant media within the menu elements 904, 906, and 908 based on search and filter criteria associated with each corresponding media category.

FIG. 10 is an interface diagram 1000 depicting a content menu 1002 generated and displayed by the contextual menu system 124. As seen in FIG. 10, the content menu 1002 includes a display of media content 1004 at a position within the content menu 1002.

According to certain example embodiments, responsive to determining that a user of the client device 102 has accessed all of the media items presented in the content menu (i.e., the content menu 902), the contextual menu system 124 may eliminate the display of the menu elements that display the media categories (e.g., the menu element 904, 906), and retrieve and display the media content 1004 based on a set of predefined preferences associated with the user profile of the user.

Figure 11:
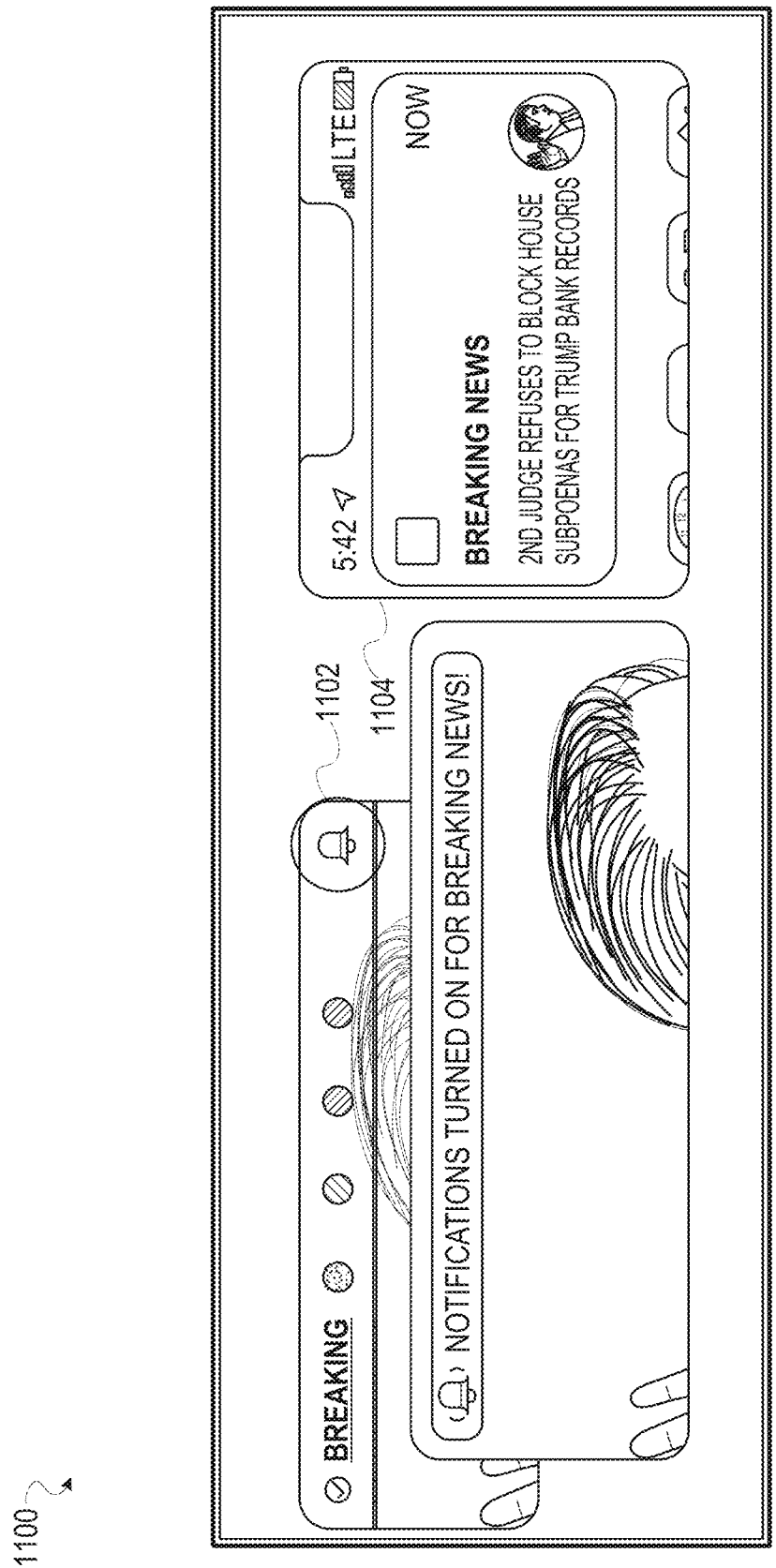
FIG. 11 is an interface diagram depicting a notification menu, according to certain example embodiments.

FIG. 11 is an interface diagram 1100 depicting a notification menu 1102 generated and displayed by the contextual menu system 124. As seen in FIG. 11, the notification menu 1102 may include an interface element to receive inputs turning notifications on or off for one or more media categories.

Accordingly, responsive to receiving an input that turns notifications on for a media category, the contextual menu system 124 may present the notification 1104 to present temporally relevant media, or location relevant media.

Software Architecture

Figure 12:
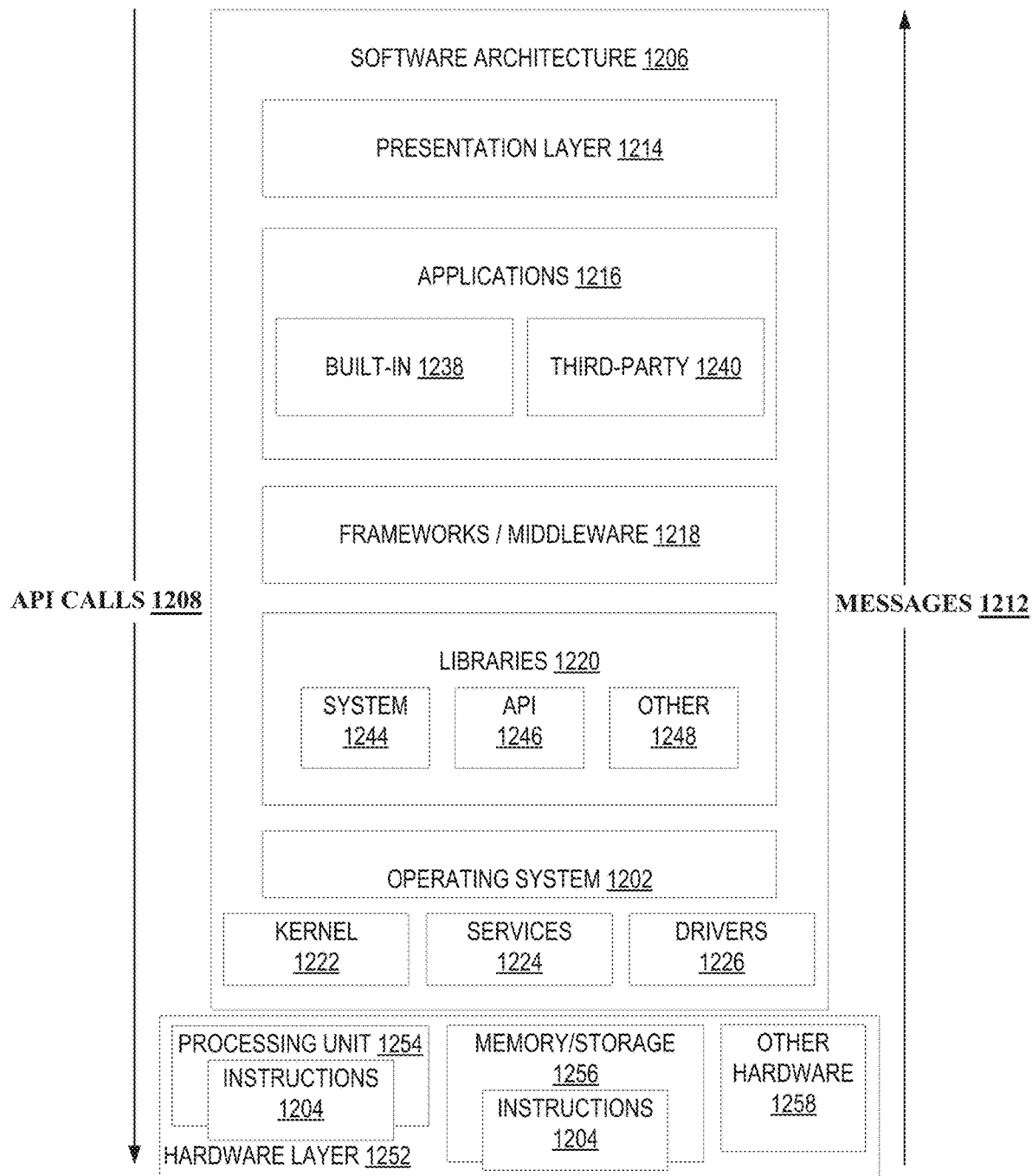
FIG. 12 is a block diagram illustrating a representative software architecture, which may be used in conjunction with various hardware architectures herein described and used to implement various embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as machine 1300 of FIG. 13 that includes, among other things, processors 1304, memory 1314, and I/O components 1318. A representative hardware layer 1252 is illustrated and can represent, for example, the machine 1200 of FIG. 12, The representative hardware layer 1252 includes a processing unit 1254 having associated executable instructions 1204. Executable instructions 1204 represent the executable instructions of the software architecture 1206, including implementation of the methods, components and so forth described herein. The hardware layer 1252 also includes memory and/or storage modules memory/storage 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, applications 1216 and a presentation layer 1214. Operationally, the applications 1216 and/or other components within the layers may invoke application programming interface (API) API calls 1208 through the software stack and receive a response as in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224 and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224 and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224 and/or drivers 1226), libraries 1220, and frameworks/middleware 1218 to create user interfaces to interact with users of the system. Alternatively, or additionally, in some systems interactions with a user may occur through a presentation layer, such as presentation layer 1214. In these systems, the application/component "logic" can be separated from the aspects of the application/component that interact with a user.

Figure 13:
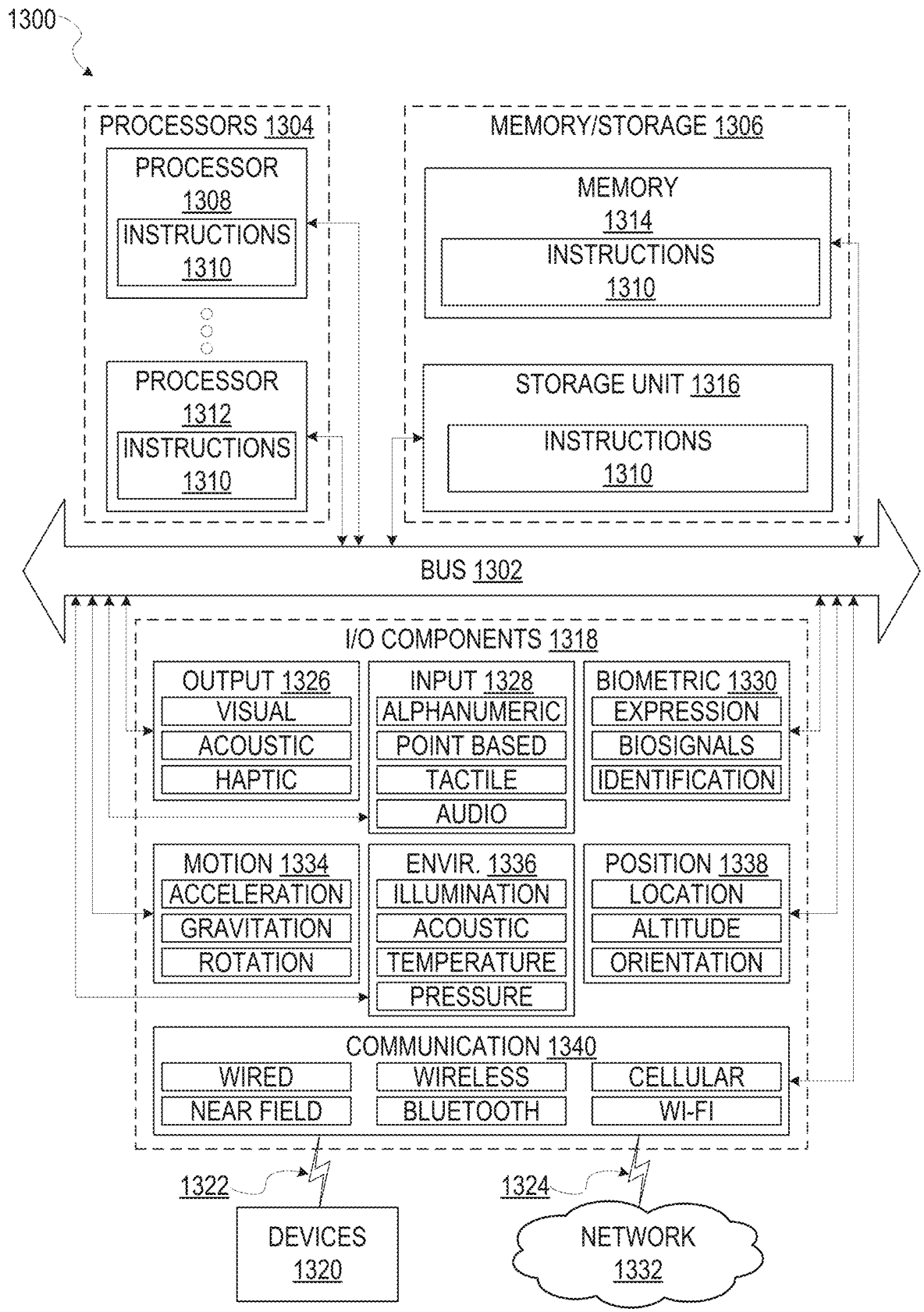
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC) a tablet computer, a laptop computer, a netbook, a set-top box (STB), a personal digital assistant (PDA), an entertainment media system, a cellular telephone, a smart phone, a mobile device, a wearable device (e.g., a smart watch) a smart home device (e.g., a smart appliance), other smart devices, a web appliance, a network router, a network switch, a network bridge, or any machine capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental environment components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1322 and coupling 1324 respectively. For example, the communication components 1340 may include a network interface component or other suitable device to interface with the network 1332. In further examples, communication components 1340 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as, location via Internet Protocol (IP) geo-location, location via Wi-Fi® signal triangulation, location via detecting a NEC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Lata Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocol S, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access tirne may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that, usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated. Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may, therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLS™)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

What is claimed is:

1. A system comprising:
a memory; and
at least one hardware processor coupled to the memory and comprising an engagement tracking application that causes the system to perform operations comprising:
receiving a request to launch an application at a client device via a user interface presented at the client device;
accessing user profile data at the client device responsive to the request to launch the application, the user profile data including a browser history;
identifying a media category from among a plurality of media categories based on the user profile data and user inputs, the media category corresponding with a media tag that identifies a set of media items;
selecting a portion of the set of media items associated with the identified media category based on the portion of the set of media items not included in the browser history;
causing display of a content menu that comprises a set of icons that correspond with each of the portion of the set of media items on the user interface at the client device, the set of icons comprising a graphical property based on the media category;
accessing the browser history associated with the user profile data, the browser history including one or more media items displayed at the client device;
removing the set of icons that correspond with the one or more media items of the portion of the set of media items from the browser history from the user interface; and
reducing a size of the content menu responsive to removing the set of icons that correspond with the one or more media items, wherein the size of the content menu corresponds with a number of icons presented within the content menu.

2. The system of claim 1, wherein the user profile data further comprises one or more of:
temporal data;
user demographic data;
user affinity data; and
user activity data.

3. The system of claim 1, wherein the set of icons comprise one or more identifiers associated with the set of media items.

4. The system of claim 1, further comprising:
receiving an input that selects a graphical element from among the set of icons, the graphical element corresponding with a media item from among the set of media items; and
causing display of a presentation of the media item in response to the input that selects the graphical element.

5. The system of claim 4, further comprising:
removing the graphical element that corresponds with the media item from among the set of graphical elements based on the causing display of the presentation of the media item.

6. A method comprising:
receiving a request to launch an application at a client device via a user interface presented at the client device;
accessing user profile data at the client device responsive to the request to launch the application, the user profile data including a browser history;
identifying a media category from among a plurality of media categories based on the user profile data and user inputs, the media category corresponding with a media tag that identifies a set of media items;
selecting a portion of the set of media items associated with the identified media category based on the portion of the set of media items not included in the browser history;
causing display of a content menu that comprises a set of icons that correspond with each of the portion of the set of media items on the user interface at the client device, the set of icons comprising a graphical property based on the media category;
accessing the browser history associated with the user profile data, the browser history including one or more media items displayed at the client device;
removing the set of icons that correspond with the one or more media items of the portion of the set of media items from the browser history from the user interface; and
reducing a size of the content menu responsive to removing the set of icons that correspond with the one or more media items, wherein the size of the content menu corresponds with a number of icons presented within the content menu.

7. The method of claim 6, wherein the user profile data further comprises one or more of:
temporal data;
user demographic data;
user affinity data; and
user activity data.

8. The method of claim 6, wherein the set of icons comprise one or more identifiers associated with the set of media items.

9. The method of claim 6, further comprising:
receiving an input that selects a graphical element from among the set of icons, the icons corresponding with a media item from among the set of media items; and
causing display of a presentation of the media item in response to the input that selects the graphical element.

10. The method of claim 9, further comprising:
removing the graphical element that corresponds with the media item from among the set of icons based on the causing display of the presentation of the media item.

11. A non-transitory machine-readable storage medium comprising instructions that, when executed by one or more processors of a machine, cause the machine to perform operations comprising:
receiving a request to launch an application at a client device via a user interface presented at the client device;
accessing user profile data at the client device responsive to the request to launch the application, the user profile data including a browser history;
identifying a media category from among a plurality of media categories based on the user profile data and user inputs, the media category corresponding with a media tag that identifies a set of media items;
selecting a portion of the set of media items associated with the identified media category based on the portion of the set of media items not included in the browser history;
causing display of a content menu that comprises a set of icons that correspond with each of the portion of the set of media items on the user interface at the client device, the set of icons comprising a graphical property based on the media category;
accessing the browser history associated with the user profile data, the browser history including one or more media items displayed at the client device;
removing the set of icons that correspond with the one or more media items of the portion of the set of media items from the browser history from the user interface; and
reducing a size of the content menu responsive to removing the set of icons that correspond with the one or more media items, wherein the size of the content menu corresponds with a number of icons presented within the content menu.

12. The non-transitory machine-readable storage medium of claim 11, wherein the user profile data further comprises one or more of:
temporal data;
user demographic data;
user affinity data; and
user activity data.

13. The non-transitory machine-readable storage medium of claim 11, wherein the set of icons comprise one or more identifiers associated with the set of media items.

14. The non-transitory machine-readable storage medium of claim 11, further comprising:
receiving an input that selects a graphical element from among the set of icons, the icons corresponding with a media item from among the set of media items; and
causing display of a presentation of the media item in response to the input that selects the graphical element.

15. The non-transitory machine-readable storage medium of claim 14, further comprising:
removing the icons that corresponds with the media item from among the set of icons based on the causing display of the presentation of the media item.

\* \* \* \* \*